(12) United States Patent
Balogh et al.

(10) Patent No.: US 10,665,387 B2
(45) Date of Patent: May 26, 2020

(54) METHOD OF FABRICATION OF A CURVILINEAR MAGNET

(71) Applicant: GM GLOBAL TECHNOLOGY OPERATIONS LLC, Detroit, MI (US)

(72) Inventors: Michael P. Balogh, Novi, MI (US); Frederick E. Pinkerton, Shelby Township, MI (US); Anil Singh Bika, Rochester Hills, MI (US); Ingrid A. Rousseau, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 767 days.

(21) Appl. No.: 15/150,760

(22) Filed: May 10, 2016

(65) Prior Publication Data

US 2017/0330684 A1 Nov. 16, 2017

(51) Int. Cl.
| H01F 41/02 | (2006.01) |
| H02K 15/03 | (2006.01) |
| H01F 13/00 | (2006.01) |
| H02K 15/02 | (2006.01) |
| B21D 11/10 | (2006.01) |
| B21D 37/10 | (2006.01) |

(52) U.S. Cl.
CPC ....... *H01F 41/0266* (2013.01); *H01F 13/003* (2013.01); *H02K 15/02* (2013.01); *H02K 15/03* (2013.01); *B21D 11/10* (2013.01); *B21D 37/10* (2013.01); *Y10T 29/49012* (2015.01)

(58) Field of Classification Search
CPC .. H02K 15/02; H02K 15/03; Y10T 29/49012; H01F 41/0266; H01F 13/003; H01F 41/0253; B21D 11/10; B21D 37/10
See application file for complete search history.

(56) References Cited

U.S. PATENT DOCUMENTS

| 3,474,528 A | 10/1969 | Walther et al. |
| 5,236,087 A | 8/1993 | Morgan |
| 5,352,302 A | 10/1994 | Takagi et al. |
| 6,555,940 B2 | 4/2003 | Naito et al. |
| 6,877,349 B2 | 4/2005 | Durney et al. |
| 7,285,897 B2 | 10/2007 | Fisher et al. |
| 8,860,275 B2 | 10/2014 | Kaiser et al. |
| 9,272,332 B2 | 3/2016 | Becker et al. |

(Continued)

FOREIGN PATENT DOCUMENTS

| CN | 1052747 A | 7/1991 |
| CN | 101889318 A | 11/2010 |

(Continued)

OTHER PUBLICATIONS

R.I. Schermer, "Tuning Permanent Magnets with Adjustable Field Clamps," Los Alamos National Laboratory, Washington PAC 1987, pp. 1514-1516.

*Primary Examiner* — A. Dexter Tugbang
(74) *Attorney, Agent, or Firm* — Quinn IP Law

(57) ABSTRACT

A method of fabricating a curvilinear magnet includes forming at least one slot in a material billet. The slotted material billet is inserted into a mold having a curvilinear pocket. The mold is closed around the slotted material billet such that the slotted material billet conforms to the curvilinear pocket and forms a curvilinear billet. The curvilinear billet is arranged in a structure. The curvilinear billet arranged in the structure is then magnetized.

11 Claims, 4 Drawing Sheets

(56) References Cited

U.S. PATENT DOCUMENTS

| | | | |
|---|---|---|---|
| 2002/0047409 A1* | 4/2002 | Hiroyuki | H02K 15/03 310/100 |
| 2003/0025415 A1* | 2/2003 | Hino | H02K 15/03 310/156.56 |
| 2009/0085416 A1* | 4/2009 | Masuzawa | H02K 15/03 310/44 |
| 2012/0267975 A1 | 10/2012 | Nishimura et al. | |
| 2015/0194848 A1 | 7/2015 | Osborne et al. | |
| 2016/0020008 A1 | 1/2016 | Powell et al. | |

FOREIGN PATENT DOCUMENTS

| | | | |
|---|---|---|---|
| JP | 2002361678 A | * | 12/2002 |
| JP | 2004236366 A | | 8/2004 |
| JP | 2014150703 A | | 8/2014 |

\* cited by examiner

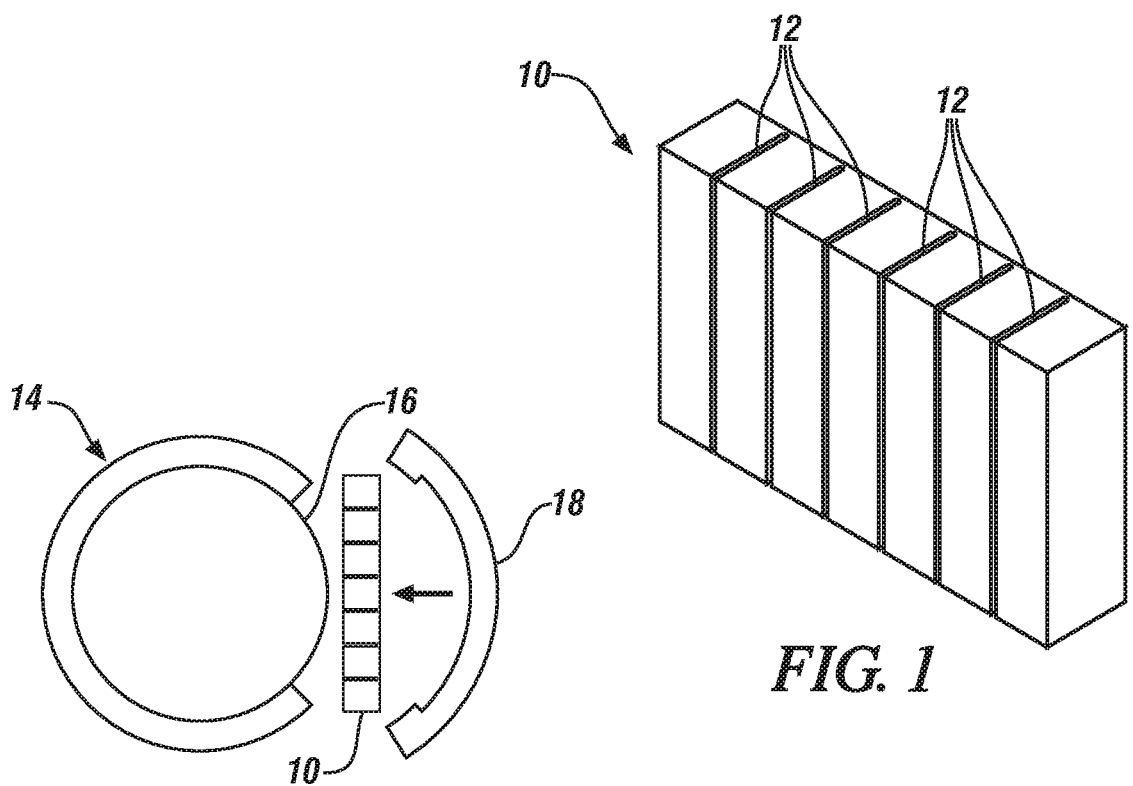
FIG. 1
FIG. 2A
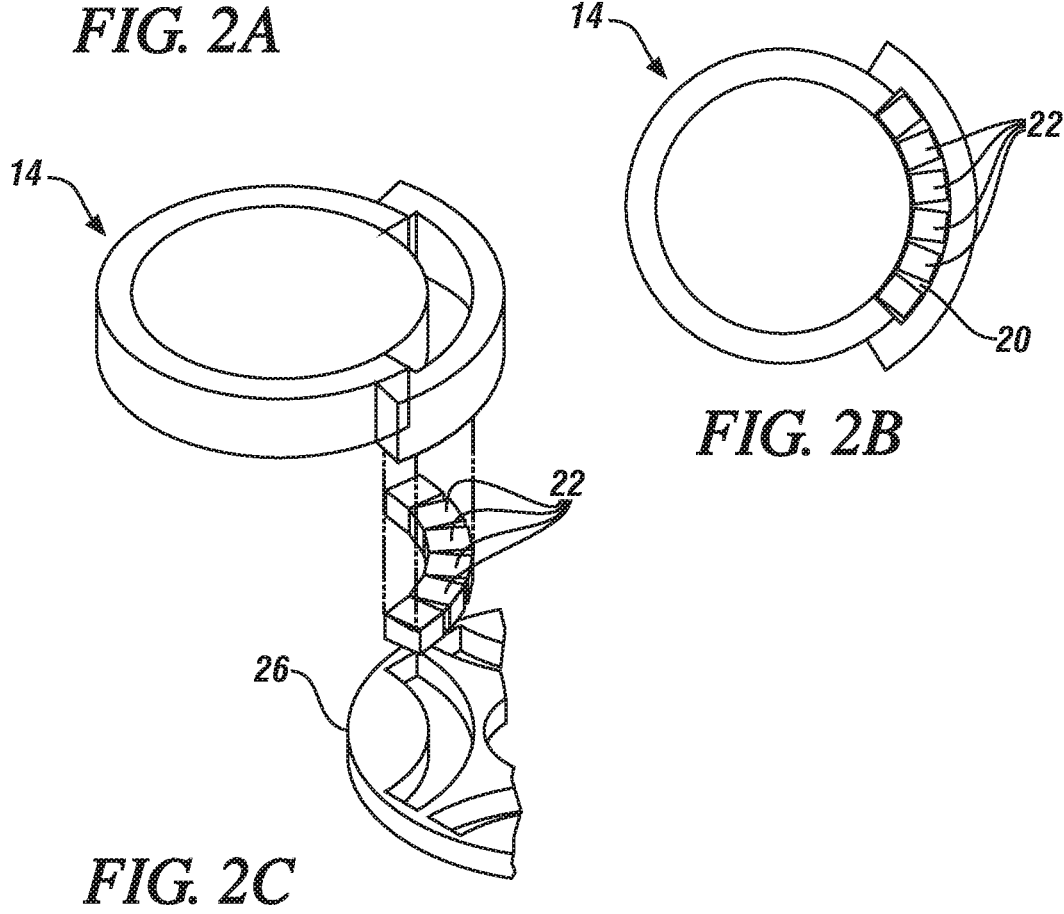
FIG. 2B
FIG. 2C

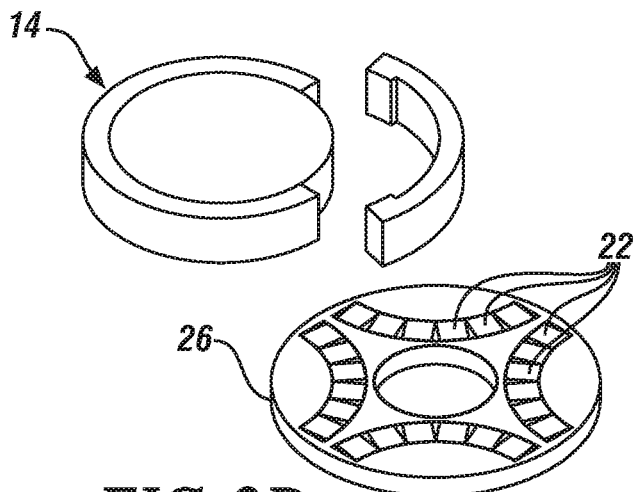
FIG. 2D
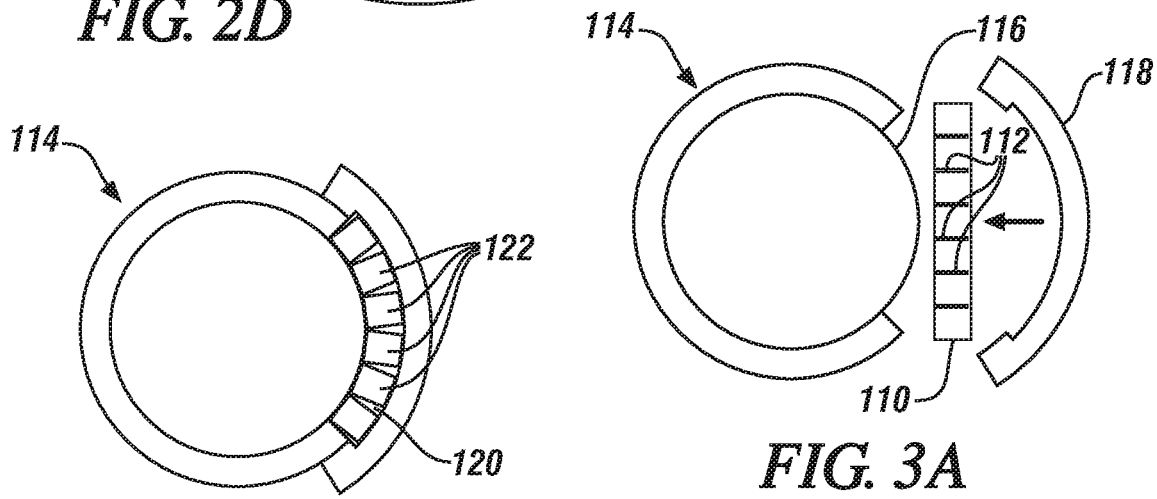
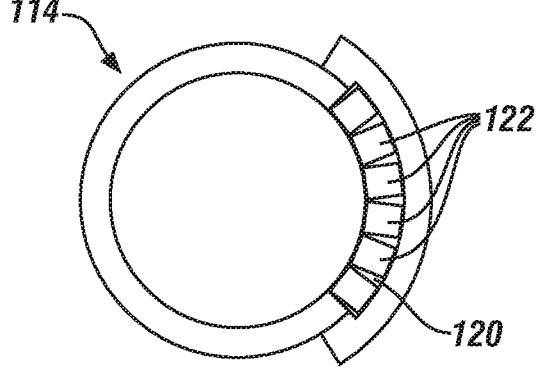
FIG. 3A
FIG. 3B
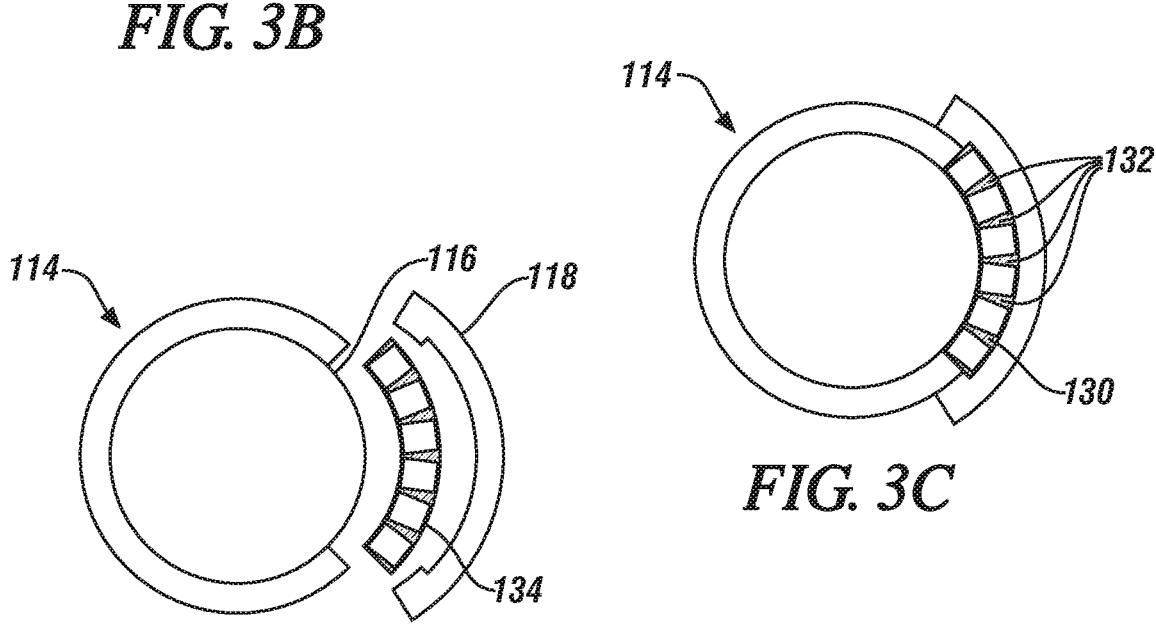
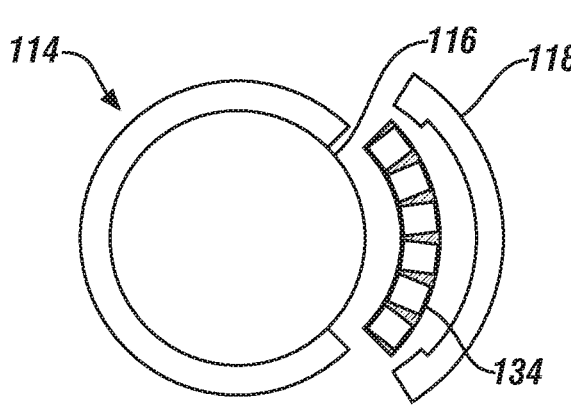
FIG. 3C
FIG. 3D

US 10,665,387 B2

METHOD OF FABRICATION OF A CURVILINEAR MAGNET

FIELD

The present disclosure relates to a curvilinear magnet and a method for fabrication thereof.

INTRODUCTION

The statements in this section merely provide background information related to the present disclosure and may not constitute prior art.

Permanent magnets are found in or used to produce many contemporary technologies from speakers to electric motors used in tools, vehicles, and more. When selecting a magnet for use, design considerations include the magnet strength and the requisite magnetic field arrangement. Certain design considerations and/or packaging constraints dictate the use of curvilinear magnets to meet the requirements. Heretofore, curvilinear magnets have been produced as bonded magnetic powder composites or machined sintered magnet blocks. However, composite magnets generally have inferior magnetic properties, while cutting magnetic arcs from rectangular billets can be costly and do not necessarily provide the requisite magnetic field arrangement.

SUMMARY

A method of fabricating a curvilinear magnet includes forming at least one slot in a material billet. The slotted material billet is inserted into a mold having a curvilinear pocket. The mold is closed around the slotted material billet such that the slotted material billet conforms to the curvilinear pocket and forms a curvilinear billet. The curvilinear billet is arranged in a structure and is then magnetized.

A method of fabricating a curvilinear magnet includes forming at least one slot in a material billet. The slotted material billet is inserted into a mold having a curvilinear pocket. The mold is closed around the slotted material billet such that the slotted material billet fractures at the at least one slot and conforms to the curvilinear pocket to form a plurality of material segments with openings arranged therebetween. The openings are filled with a binder material to define a curvilinear billet.

A method of fabricating a curvilinear magnet includes forming at least one slot in a material billet. A backing is inserted into a mold having a curvilinear pocket. The slotted material billet is also inserted into the mold. The mold is closed around the slotted material billet and the backing such that the slotted material billet fractures at the at least one slot. The backing and the slotted material billet conform to the curvilinear pocket to form a plurality of material segments with openings arranged therebetween. The backing and the plurality of material segments are bonded together to define a curvilinear billet.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective view of an exemplary kerf-cut material billet according to the present disclosure;

FIG. 2A is a schematic view of an exemplary kerf-cut billet before insertion in an exemplary mold press;

FIG. 2B is a schematic view of the exemplary kerf-cut segments after closure of the mold press;

FIG. 2C is a schematic view of the segments during insertion into a rotor;

FIG. 2D is a schematic view of the segments after insertion into the rotor and with the mold press opened for another kerf-cut billet;

FIG. 3A is a schematic view of an exemplary kerf-cut billet before insertion in an exemplary mold press;

FIG. 3B is a schematic view of the exemplary kerf-cut segments after closure of the mold press;

FIG. 3C is a schematic view of a binder filling openings between the segments while in the closed mold press;

FIG. 3D is a schematic view of the curvilinear segments with binder after removal from the mold press and with the mold press opened for another kerf-cut billet;

DETAILED DESCRIPTION

Figure 4A:
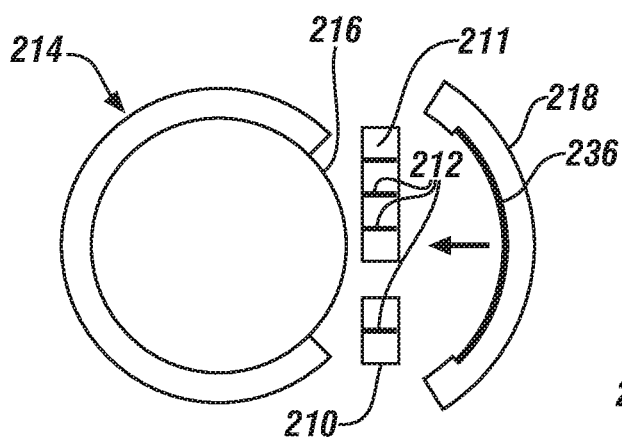
FIG. 4A is a schematic view of a pair of exemplary kerf-cut billets before insertion in an exemplary mold press with a form arranged therein.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Electric machines, such as motors or generators, use electric potential energy to produce mechanical energy, or conversely, use mechanical energy to produce electrical energy through the interaction of magnetic fields and current-carrying conductors. Generally, an interior permanent magnet machine includes a rotor having a plurality of magnets of alternating polarity around the outer periphery of the rotor. The rotor is rotatable within a stator, which generally includes a plurality of windings and magnetic poles of alternating polarity. The magnets used in interior permanent magnet machines are often rectangular in shape; however, arc-shaped or parabolic magnets have been found to provide improved performance characteristics. To date, arc-shaped or parabolic magnets have been formed by machining a rectangular material billet to shape or by molding a composite material in a form to achieve the requisite final shape. However, the machining process is materially wasteful and the molding process provides inferior magnetic capabilities.

Referring now to FIG. 1, an exemplary flat, rectangular material billet 10 is shown. The material billet 10 is a commercially available material billet used in magnetic applications, such as with a permanent magnet rotor found in a permanent magnet electric motor or a permanent magnet generator. Permanent magnets may be beneficial for use in the automotive and aerospace manufacturing industries; the pulp and metal processing industries; the agricultural, military, appliance, electronic, power generation, construction/tool, food and beverage, consumer products and medical service industries; and general manufacturing applications. The material billet 10 can be formed from a ferromagnetic material, such as an iron, nickel, or cobalt, or can be formed from an alloy of a rare earth material. The material may be magnetically isotropic, such that the magnetic moments within the magnet have no preferred orientation and the magnet is magnetizable in any direction. In one example, the starting material billet is an oriented magnetic material such that the magnetic moment lies in a specific direction within the billet, and can be magnetized only along that direction. The orientation direction can lie along any direction within the billet. For example, the magnetization may lie perpendicular to the large face (e.g., left and right faces of the material billet 10 in FIG. 1).

The material billet 10 includes slots 12 arranged to extend partially or completely through the material thickness (e.g., through a kerf-cutting process). The slots 12 may be straight cuts or may take the form of a wedge-shaped cut. In other words, portions of the material billet 10 can be approximated by an array of smaller rectangular prisms or trapezoidal prisms (i.e., "keystone" segments). There may be one or more slots 12 present in the material billet 10 with the slots 12 arranged in a predetermined relationship along the length of the material billet 10 so as to provide a final curvilinear shape after the bending process described below. While the slots 12 are shown equally distributed along the material billet 10, it should be understood that the slots 12 may also, for example, be biased to one side of the material billet 10, arranged only near ends or at the central portion of the material billet 10, be located compactly at a first region and sparsely at a second region of the material billet 10, or may be located on either side of the material billet 10 (e.g., to create the desired final shape having at least two opposite curvature directions, such as with an "S" shape).

With reference now to FIG. 2A, a schematic representation of the kerf-cut material billet 10 before insertion into an exemplary mold press 14 is provided. The mold press 14 as shown includes a first tool 16 and a corresponding second tool 18. The tools 16, 18 move (i.e., first moves toward second, second moves toward first, or both move together) so to close the mold press 14 around the kerf-cut material billet 10 within a pocket 20, as best shown in FIG. 2B. The first tool 16 is shown having a convex shape and the second tool 18 is shown having a concave shape such that the pocket 20 is arc-shaped over its length. While the first and second tools 16, 18 of the mold press 14 are shown having corresponding arc shapes, it should be understood that any curvilinear shape for the tools is also contemplated. As an example, the first and second tools 16, 18 may have a corresponding parabolic shape, arc-shaped end portions with a linear portion therebetween, or a wave shape (i.e., adjoined convex and concave curves). Furthermore, the first and second tools 16, 18 may also have shapes that do not correspond, such that the pocket 20 may have another geometric shape (e.g., half circle, polygonal).

The pocket 20 is sized for receiving the kerf-cut material billet 10. The material billet 10 is a brittle material that fractures upon a bending action when performed at room temperature (e.g., cold working). Closing the mold press 14 causes a controlled fracture of the kerf-cut material billet 10 at the location of the slots 12 as the material billet 10 is forced to conform to the curvilinear shape of the mold pocket 20. In this way, the kerf-cut material billet 10 is fractured into a plurality of material segments 22 arranged within the curvilinear pocket 20. The material billet 10 can be arranged with the slots 12 opening toward either the first tool 16 or the second tool 18, as preferred. While the material billet 10 is described as being formed from a brittle material that fractures upon bending, it should be understood that certain applications may utilize magnets formed from ductile materials that will yield (i.e., bend).

Referring now to FIG. 2C, the plurality of material segments 22 may be moved from the mold press 14 into a rotor 26 (e.g., with a ram). After the material segments 22 are fully inserted into the rotor 26, the mold press 14 may then be opened for receipt of another kerf-cut material billet 10 (see FIG. 2D). After insertion, the material segments 22 are freely movable within the rotor 26, so an adhesive may be applied to the segments 22 in the rotor 26 to retain the geometry and spacing of the material segments 22 with respect to the rotor 26. Alternatively, the plurality of material segments 22 may be sized so as to be pressed into the rotor 26 with an interference- or press-fit to retain their orientation within the rotor 26. Once fixed within the rotor 26, the material segments 22 may be magnetized with either a steady-state or impulse-type magnetizer. While the material segments 22 are described as being fully magnetized within the assembled state, it should be understood that a partial magnetization process may occur during any of the pre-assembled steps in order to ease the re-magnetization in the final desired magnetic polarity configuration.

The material billet 10 may be comprised of an oriented magnetic material with the direction of the magnetic alignment perpendicular to the flat surface of the billet 10 (e.g., parallel to the direction of the kerf cuts). After forming the curvilinear magnet, the individual material segments 22 retain the alignment direction perpendicular to the surface, such that when magnetized, the curvilinear magnet has magnetic moment directions that vary with position along the magnet (i.e., perpendicular to the local surface). The ability to spatially vary the magnetic moment directions provides improved motor efficiency. It should be noted, however, that the starting billet can be fabricated with a different direction of magnetic moment if so desired, and the individual segments after forming the curvilinear magnet will retain that orientation. Further, the magnet may also be isotropic, meaning that it can be magnetized in any direction, and the direction of magnetization of the individual segments after forming will be defined by the spatial distribution and strength of the magnetizing field during the magnetizing process.

With reference now to FIG. 3A, a schematic representation of a kerf-cut material billet 110 before insertion into an exemplary mold press 114 is provided. The material billet 110 and mold press 114 are similar to the material billet 10 and mold press 14, and as such, like numbers will be used to describe like parts. The mold press 114 is shown having a first, convex tool 116 and a corresponding second, concave tool 118. The concave tool 118 moves toward the convex tool 116 to close the mold press 114 around the kerf-cut material billet 110 within a pocket 120, as best shown in FIG. 3B. The pocket 120 is sized for receiving the kerf-cut material billet 110. Closing the mold press 114 causes a controlled fracture of the kerf-cut material billet 110 at the location of kerf-cut slots 112 as the material billet 110 is forced to conform to the curvilinear shape of the mold pocket 120. The kerf-cut material billet 110 is fractured into a plurality of material segments 122 arranged within the curvilinear pocket 120.

Referring now to FIG. 3C, a binder 130 is added to the mold press 114 at the pocket 120 so as to fill in open spacing 132 between the plurality of material segments 122. The binder 130 may be any binding material for retaining the curvilinear shape of the material segments 122, such as an adhesive, a low-temperature solder, a heat-cured material, a neat or reinforced thermoplastic, or neat or reinforced thermoset. After the binder 130 has hardened/cured between and/or around the material segments 122, the mold press 114 may then be opened to remove the curvilinear magnet 134 (see FIG. 3D). The curvilinear magnet 134 will retain its shape after removal from the mold press 114 due to the binder 130. The curvilinear magnet 134 may be inserted into or fixed on a surface of a rotor or can be used in other permanent magnet applications. Once secured in location, the curvilinear magnet 134 may be magnetized with either a steady-state or impulse-type magnetizer such that the individual material segments 122 have a controlled magnetic moment across the curvilinear shape (e.g., normal to tangent of the curve). As previously noted, it should be understood that a partial magnetization process may take place during any of the pre-assembled steps in order to ease the re-magnetization in the final desired magnetic polarity configuration.

As previously discussed with respect to the material billet 10, the material billet 110 may be comprised of an oriented magnetic material with the direction of the magnetic alignment perpendicular to the flat surface of the billet 110 (e.g., parallel to the direction of the kerf cuts). After forming the curvilinear magnet, the individual material segments 122 retain the alignment direction perpendicular to the surface, such that when magnetized, the curvilinear magnet has magnetic moment directions that vary with position along the magnet (i.e., perpendicular to the local surface). The ability to spatially vary the magnetic moment directions provides improved motor efficiency. It should be noted, however, that the starting billet can be fabricated with a different direction of magnetic moment if so desired, and the individual segments after forming the curvilinear magnet will retain that orientation. Further, the magnet may also be isotropic, meaning that it can be magnetized in any direction, and the direction of magnetization of the individual segments after forming will be defined by the spatial distribution and strength of the magnetizing field during the magnetizing process.

With reference now to FIG. 4A, a schematic representation of a pair of kerf-cut material billets 210, 211 before insertion into an exemplary mold press 214 is provided. The material billets 210, 211 and mold press 214 are similar to the material billet 10 and mold press 14, and as such, like numbers will be used to describe like parts. The mold press 214 is shown having a first, convex tool 216 and a corresponding second, concave tool 218 with a form 236 arranged thereon. The form 236 may be a thin strip of material in a rigid form (e.g., steel, rigid plastic) or in a ductile form (e.g., aluminum, soft polymer, rubber) for securing the material billets 210, 211 in a predetermined relationship to one another. The form 236 may be a magnetic material (e.g., iron or steel) or may be a non-magnetic material (e.g., aluminum, stainless steel, other non-magnetic metal, or a polymer) for creating a "magnetic gap" between the material billets 210, 211 and a mated structure (e.g., interior wall of rotor). While the form 236 is depicted arranged on the concave tool 218, it could also be arranged alternatively on the convex tool 216 or a pair of forms 236 could be arranged on both the convex and concave tools 216, 218. Furthermore, the form 236 is depicted having a uniform thickness over its length, but a non-uniform cross-section is also contemplated.

Figure 4B:
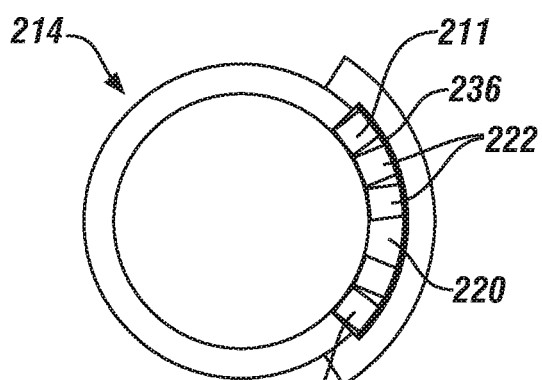
FIG. 4B is a schematic view of the exemplary kerf-cut segments after closure of the mold press and bonding to the form.

During operation, the concave and/or convex tools 216, 218 move to close the mold press 214 around the kerf-cut material billets 210, 211 within a pocket 220, as best shown in FIG. 4B. The pocket 220 is sized for receiving the combined kerf-cut material billets 210, 211 and form 236. The material billets 210, 211 are formed of a brittle material that fractures upon a bending action. Closing the mold press 214 causes a controlled fracture of the kerf-cut material billets 210, 211 at the location of kerf-cut slots 212 as the material billets 210, 211 are forced to conform to the curvilinear shape of the mold pocket 220. In this way, the kerf-cut material billets 210, 211 are fractured into a plurality of material segments 222 arranged within the curvilinear pocket 220. The plurality of material segments 222 are bonded to the form 236 to create a curvilinear magnet 234.

Figure 4C:
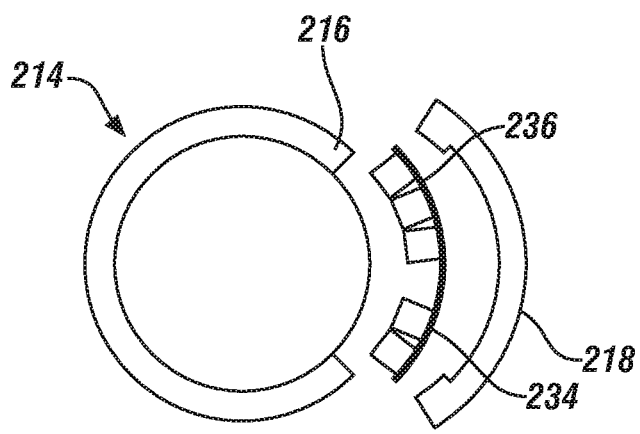
FIG. 4C is a schematic view of the curvilinear segments bonded to the form after removal from the mold press and with the mold press opened for another pair of kerf-cut billets.

Referring now to FIG. 4C, the mold press 214 may be opened to remove the curvilinear magnet 234. The curvilinear magnet 234 will retain its shape after removal from the mold press 214 due to the structure of the form 236. The curvilinear magnet 234 may be inserted into or secured on a surface of a rotor, as previously described, or can be used in other permanent magnet applications. Once secured in location, the curvilinear magnet 234 may be magnetized with either a steady-state or impulse-type magnetizer. If the starting magnet is an oriented magnet, the magnetic moment is aligned along a specific direction such that the individual material segments 222 have a controlled magnetic moment across the curvilinear shape (e.g., normal to the surface of the magnet). The spacing between the material billets 210, 211 creates an "air gap" in the permanent magnet for overcoming packaging constraints and/or for achieving improved motor efficiency because the magnetic moment of each segment can be controlled across the curvilinear shape.

Figure 5A:
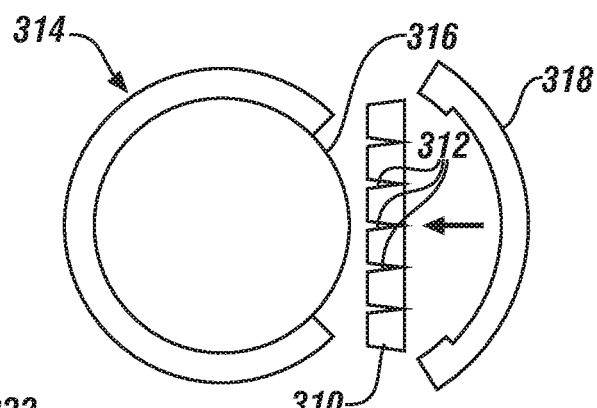
FIG. 5A is a schematic view of an exemplary wedge-shaped kerf billet before insertion in an exemplary mold press.
Figure 5B:
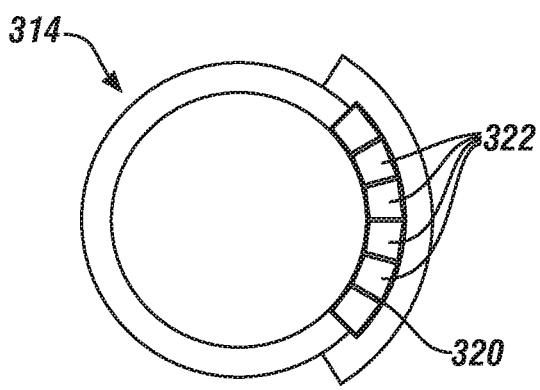
FIG. 5B is a schematic view of the exemplary kerf-cut segments after closure of the mold press.

With reference now to FIG. 5A, a schematic representation of a kerf-cut material billet 310 before insertion into an exemplary mold press 314 is provided. Notably, the slots 312 in this representation are in the form of angular openings (e.g., wedge-shaped). The material billet 310 and mold press 314 are similar to the material billet 10 and mold press 14, and as such, like numbers will be used to describe like parts. The mold press 314 is shown having a first, convex tool 316 and a corresponding second, concave tool 318. The convex and/or concave tool 316, 318 move to close the mold press 314 around the kerf-cut material billet 310 within a pocket 320, as best shown in FIG. 5B. The pocket 320 is sized for receiving the kerf-cut material billet 310. Closing the mold press 314 causes a controlled fracture of the kerf-cut material billet 310 at the location of angular slots 312. In this way, the kerf-cut material billet 310 is fractured into a plurality of trapezoidal material segments 322 arranged within the curvilinear pocket 320. The material billet 310 is arranged with the angular slots 312 opening toward the convex tool 316 such that fracturing causes opposing faces of the angular slots 312 to move together, thereby tightly packing the trapezoidal material segments 322 together. While the convex and concave tools 316, 318 of the mold press 314 are shown having corresponding arc configurations, it should be understood that any curvilinear shape for the tool is also contemplated. As an example, the convex and concave tools 316, 318 may have a parabolic shape, arc-shaped end portions with a linear portion therebetween, or a wave shape (i.e., adjoined convex and concave curves). With these alternately disclosed arrangements, the angular slots 312 may be appropriately arranged on both sides of the material billet 310 so as to provide the tightly packed material segment arrangement.

Figure 5C:
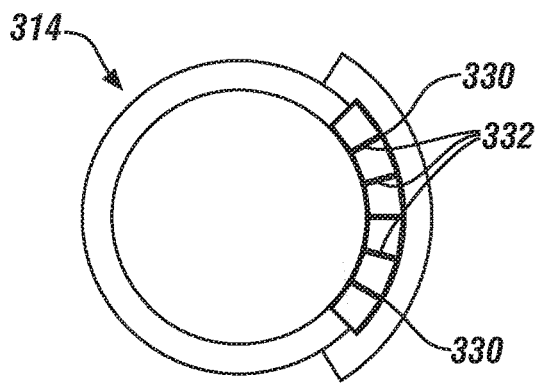
FIG. 5C is a schematic view of the segments with a binder filling openings between the segments while in the closed mold press.
Figure 5D:
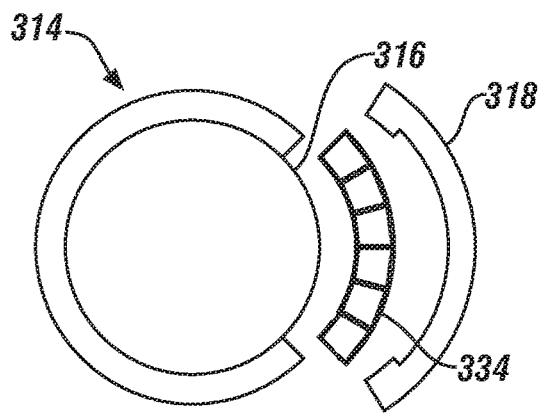
FIG. 5D is a schematic view of the curvilinear segments with binder after removal from the mold press and with the mold press opened for another kerf-cut billet.

Referring now to FIG. 5C, a binder 330 is added to the mold press 314 at the pocket 320 so as to fill in open spacing 332 between the plurality of material segments 322. The binder 330 may be any binding material for retaining the final curvilinear shape of the material segments 322, such as an adhesive, a low-temperature solder, a heat-cured material, a neat or reinforced thermoplastic, or a neat or reinforced thermoset. After the binder 330 has hardened/cured between and/or around the material segments 322, the mold press 314 may then be opened to remove the curvilinear magnet 334 (see FIG. 5D). The curvilinear magnet 334 will retain its shape after removal from the mold press 314 due to the binder 330. The curvilinear magnet 334 may be inserted into or affixed to a surface of a rotor, as previously described, or can be used in other permanent magnet applications. Once secured in location, the curvilinear magnet 334 may be magnetized with either a steady-state or impulse-type magnetizer such that the individual material segments 322 have a controlled magnetic moment across the curvilinear shape (e.g., normal to tangent of the curve).

As previously discussed with respect to the material billet 10, the material billet 310 may be comprised of an oriented magnetic material with the direction of the magnetic alignment perpendicular to the flat surface of the billet 310 (e.g., parallel to the direction of the kerf cuts). After forming the curvilinear magnet, the individual material segments 322 retain the alignment direction perpendicular to the surface, such that when magnetized, the curvilinear magnet has magnetic moment directions that vary with position along the magnet (i.e., perpendicular to the local surface). The ability to spatially vary the magnetic moment directions provides improved motor efficiency. It should be noted, however, that the starting billet can be fabricated with a different direction of magnetic moment if so desired, and the individual segments after forming the curvilinear magnet will retain that orientation. Further, the magnet may also be isotropic and the direction of magnetization of the individual segments after forming will be defined by the spatial distribution and strength of the magnetizing field during the magnetizing process.

Figure 6A:
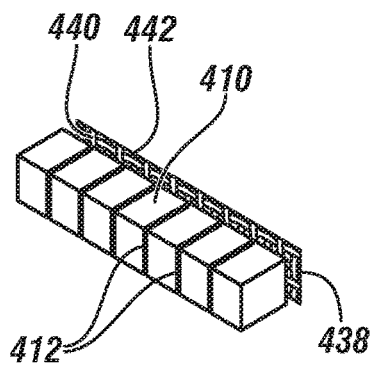
FIG. 6A is a schematic view of two alternate arrangements for an exemplary kerf-cut billet with adhesive mat.

With reference now to FIG. 6A, a schematic representation of a kerf-cut material billet 410 having a backing mat 438 is provided. The backing mat 438 can be a flexible backing for design and dimensional flexibility (e.g., aluminum foil or a fiber bonded with a polymer) and may be coated with an adhesive on a first surface 440 for securing the backing mat 438 to the material billet 410. An opposing, non-adhesive surface 442 of the backing mat 438 can be coated with a material having either a low surface energy (e.g., for facilitating insertion) or a high surface energy (e.g., for increasing retention after insertion). The backing mat 438 is secured to one or both sides of the material billet 410 prior to insertion within a mold press 414. The material billet 410 and mold press 414 are similar to the material billet 10 and mold press 14, and as such, like numbers will be used to describe like parts.

Figure 6B:
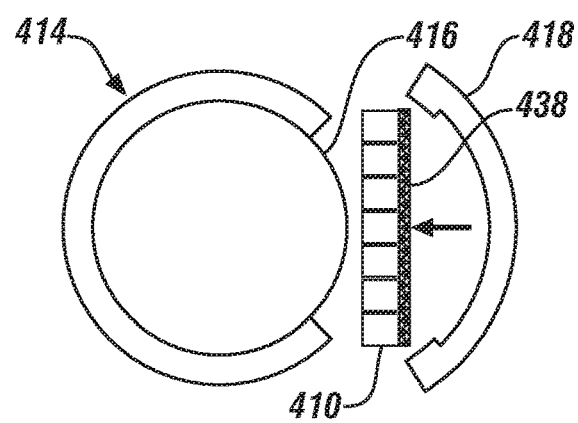
FIG. 6B is a schematic view of the kerf-cut billet with adhesive mat before insertion in an exemplary mold press.
Figure 6C:
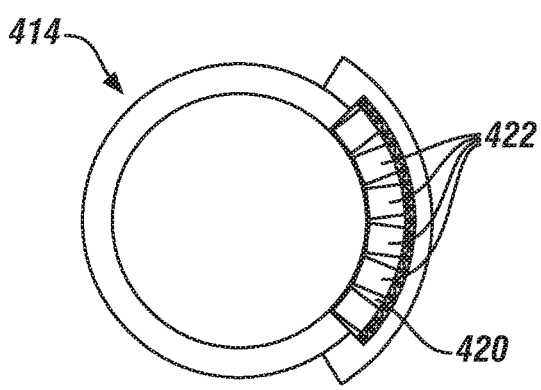
FIG. 6C is a schematic view of the kerf-cut segments with adhesive mat after closure of the mold press.

Referring now to FIGS. 6B and 6C, the mold press 414 is shown having a first, convex tool 416 and a corresponding second, concave tool 418 movable for closing the mold press 414 around the kerf-cut material billet 410. A pocket 420 is sized for receiving the combined kerf-cut material billet 410 and backing mat(s) 438. Closing the mold press 414 causes a controlled fracture of the kerf-cut material billet 410 at the location of kerf-cut slots 412 so as to conform to the curvilinear shape of the mold pocket 420. In this way, the kerf-cut material billet 410 is fractured into a plurality of material segments 422 arranged within the curvilinear pocket 420.

Figure 6D:
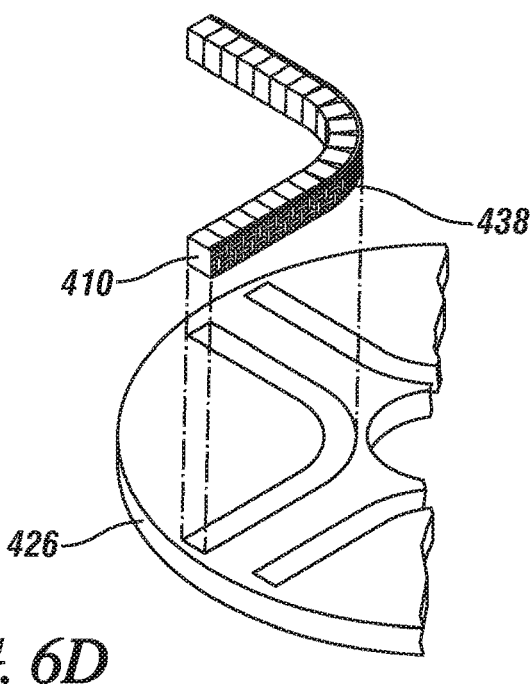
FIG. 6D is a schematic view of the kerf-cut segments with adhesive mat after insertion into the rotor.

Referring now to FIG. 6D, the curvilinear magnet 434 with backing mat(s) 438 can be flexed into an appropriate shape for insertion into a rotor 426 due to the structure of the backing mat(s) 438. The curvilinear magnet 434 may be inserted into the rotor 426, as previously described, or can be used in other permanent magnet applications. Once secured in location, the curvilinear magnet 434 may be magnetized with either a steady-state or impulse-type magnetizer such that the individual material segments 422 have a controlled magnetic moment across the curvilinear shape (e.g., normal to tangent of the curve). As can be seen, the backing mat(s) 438 allow the curvilinear magnet 434 to be moved without the need for using binder, while still maintaining the integrity of the magnet (i.e., no loose parts). Notably, a binder material can be added after the curvilinear magnet 434 is arranged in a final location in order to alleviate any dimensionality issues that could arise. Furthermore, the backing mat(s) 438 can be used to create an "air gap" in the permanent magnet for overcoming packaging constraints and/or for achieving improved motor efficiency because the magnetic moment of each segment can be controlled across the curvilinear shape.

As previously discussed with respect to the material billet 10, the material billet 410 may be comprised of an oriented magnetic material with the direction of the magnetic alignment perpendicular to the flat surface of the billet 410 (e.g., parallel to the direction of the kerf cuts). After forming the curvilinear magnet, the individual material segments 422 retain the alignment direction perpendicular to the surface, such that when magnetized, the curvilinear magnet has magnetic moment directions that vary with position along the magnet (i.e., perpendicular to the local surface). The ability to spatially vary the magnetic moment directions provides improved motor efficiency. It should be noted, however, that the starting billet can be fabricated with a different direction of magnetic moment if so desired, and the individual segments after forming the curvilinear magnet will retain that orientation. Further, the magnet may also be isotropic, meaning that it can be magnetized in any direction, and the direction of magnetization of the individual segments after forming will be defined by the spatial distribution and strength of the magnetizing field during the magnetizing process.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A method of fabricating a curvilinear magnet comprising:
    forming at least one slot along a length of a material billet;
    inserting the material billet having the at least one slot into a mold having a first tool and a second tool, the first tool having a curvilinear pocket, the second tool having a curvilinear shape, and the material billet being disposed between the first tool and the second tool with the at least one slot facing the curvilinear pocket of the first tool;
    closing the first tool and the second tool of the mold around the material billet such that the material billet having the at least one slot bends and conforms to the curvilinear pocket of the first tool and the curvilinear shape of the second tool to form a curvilinear billet;
    removing the curvilinear billet from the mold;
    arranging the curvilinear billet in a structure; and
    magnetizing the curvilinear billet arranged in the structure.

2. The method of fabricating a curvilinear magnet of claim 1, further comprising:
    providing a binder to the curvilinear billet in the structure after the curvilinear billet has been removed from the mold to secure the curvilinear billet to the structure.

3. The method of fabricating a curvilinear magnet of claim 1, wherein the structure is a rotor of a permanent magnet machine.

4. The method of fabricating a curvilinear magnet of claim 1, wherein the material billet comprises a ferromagnetic material.

5. The method of fabricating a curvilinear magnet of claim 1, wherein the material billet comprises a ductile material.

6. The method of fabricating a curvilinear magnet of claim 1, wherein the at least one slot comprises at least one straight cut slot.

7. The method of fabricating a curvilinear magnet of claim 1, wherein the at least one slot comprises at least one wedge-shaped cut slot.

8. The method of fabricating a curvilinear magnet of claim 1, wherein the at least one slot in the material billet defines a plurality of material segments.

9. The method of fabricating a curvilinear magnet of claim 8, wherein a direction of magnetization of each of the plurality of material segments is defined by a spatial distribution of a magnetizing field during the magnetization.

10. The method of fabricating a curvilinear magnet of claim 1, wherein the magnetization is performed with a steady-state magnetizer.

11. The method of fabricating a curvilinear magnet of claim 1, wherein the magnetization is performed with an impulse-type magnetizer.

* * * * *